United States Patent [19]

Borner

[11] 3,927,772

[45] Dec. 23, 1975

[54] VEHICLE PARKING AND ROTARY ELEVATOR ASSEMBLY

[76] Inventor: Hans Borner, 4010 Cote St., Catherine Road, Apt. 14, Montreal, Quebec, Canada

[22] Filed: July 10, 1974

[21] Appl. No.: 487,255

[52] U.S. Cl. .......................... 214/16.1 BA; 14/71
[51] Int. Cl.² ........................................ E04H 6/16
[58] Field of Search... 214/16.1 R, 16.1 B, 16.1 BA, 214/16.1 BB; 14/71 R, 71 M, 71 B, 71; 104/48, 49

[56] References Cited
UNITED STATES PATENTS

| | | | |
|---|---|---|---|
| 1,826,357 | 10/1931 | Makutchan | 214/16.1 BB |
| 1,841,530 | 1/1932 | Geiger | 214/16.1 BB |
| 2,663,446 | 12/1953 | Romain | 214/16.1 BB |
| 2,901,130 | 8/1959 | Thomas | 214/16.1 B |
| 3,006,008 | 10/1961 | Loomis et al. | 14/71 B |

FOREIGN PATENTS OR APPLICATIONS 1,138,184   4/1966   United Kingdom ......... 214/16.1 BA

*Primary Examiner*—Robert B. Reeves
*Assistant Examiner*—David A. Scherberl

[57] ABSTRACT

A wheel forming a rotary vehicle elevator and vehicle parking assembly and characterized by optimum use of space, direct access to a plurality of floors for efficient operation and multi-level parking, by junction panels allowing safe rolling on and off the elevator wheel, and by avoidance of stress concentration on a single supporting axle. A vehicle parking assembly comprising a wheel including a pair of axially spaced coaxial ring gears supported for rotation about a common horizontal axis, vehicle carrying platforms pivotally suspended to the ring gears, a plurality of vehicle parking floors extending into edgewise adjoining relationship relative to the circumferential periphery of the ring gears and at different levels relative to the common axis, parking floor portions arranged radially centrally relative to the platforms, idler rollers supporting the ring gears at the top and bottom thereof, and junction panels supported by the floors and slidable into engagement with the platforms upon registry therewith.

5 Claims, 6 Drawing Figures

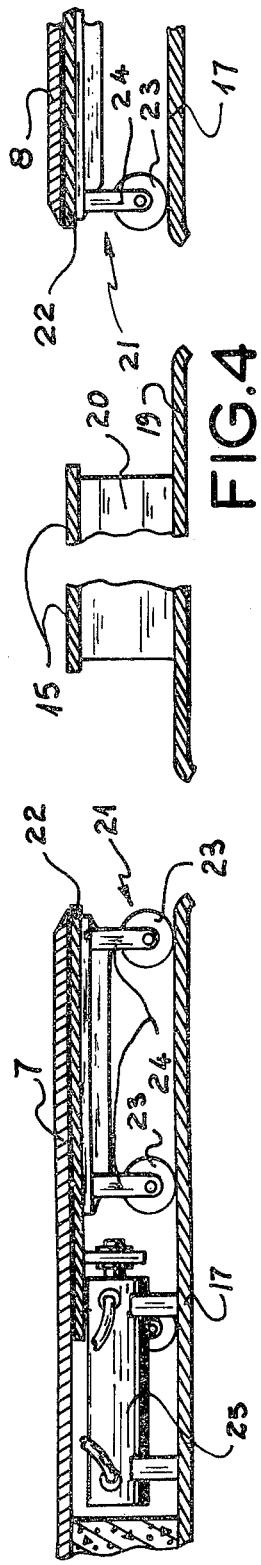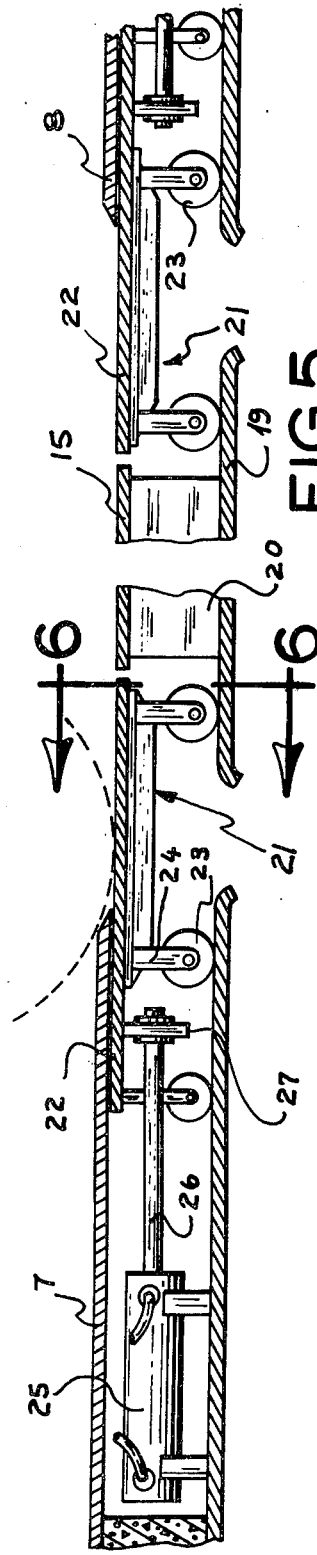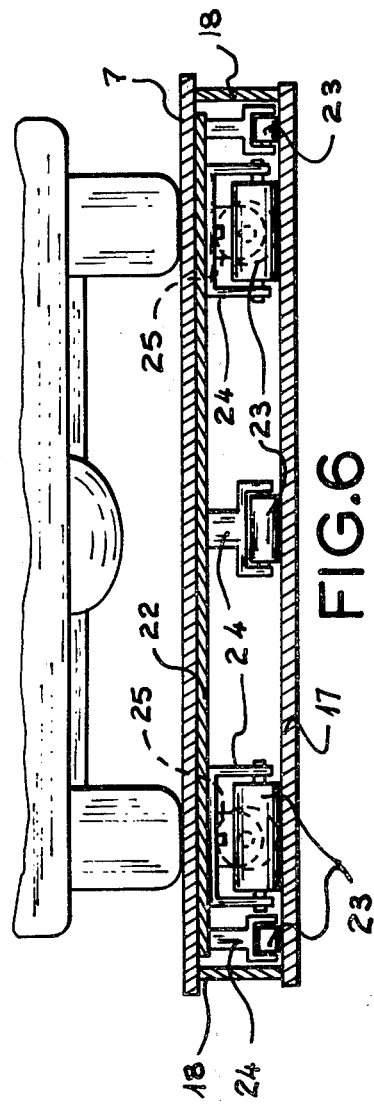

VEHICLE PARKING AND ROTARY ELEVATOR ASSEMBLY

This invention relates to vehicle parking garages and, more particularly, to a vehicle parking and elevator of the rotary type.

Up to now, there have been proposed vehicle parking and rotary elevator assemblies of the above type, such as the one described in the U.S. Pat. No. 3,356,233, issued on Dec. 5, 1967, which presents disadvantages among which we note a relatively inefficient use of space, direct access to only one floor level with the resultant limitations in the construction of the elevator wheel with respect to ground level and the huge loading of a single central axle.

It is a general object of the present invention to provide a vehicle parking and rotary elevator assembly of the above type, which makes optimum use of the taken space.

It is another general object of the present invention to provide a vehicle parking and rotary elevator assembly which gives direct access to a multiplicity of floors for more efficient operation and multilevel parking without having to use access ramps as in conventional multilevel parkings.

It is another object of the invention to provide a vehicle parking and rotary elevator assembly which includes pivotally suspended vehicle carrying platforms and junction devices adapted to provide safe passage of a vehicle on and off thereof.

It is a more specific object of the present invention to provide a vehicle parking and rotary elevator assembly which includes an elevator wheel having axially open ends to allow parking floors and space centrally thereof for more efficient use of space.

It is a further object of the invention to provide a vehicle parking and rotary elevator assembly which includes an improved manner of supporting the elevator wheel avoiding excessive loading on any particular axle and, more particularly, which includes a plurality of idler rollers producing multi-point support of the elevator wheel, thus preventing excessive stress concentration therein and collapse thereof without having to make the wheel particularly strong.

The above and other objects and advantages of the invention will be better understood in the light of the following detailed description of a preferred embodiment thereof, which is illustrated, by way of example only, in the accompanying drawings, wherein:

FIG. 4 is a cross-sectional and enlarged scale view as seen along line 4—4 in FIG. 2 and illustrating a junction panel assembly;

FIG. 5 is a view similar to FIG. 4 but with the junction panel assembly in operative joining position; and FIG. 6 is a cross-sectional view as seen along line 6—6 in FIG. 5.

Figure 2:
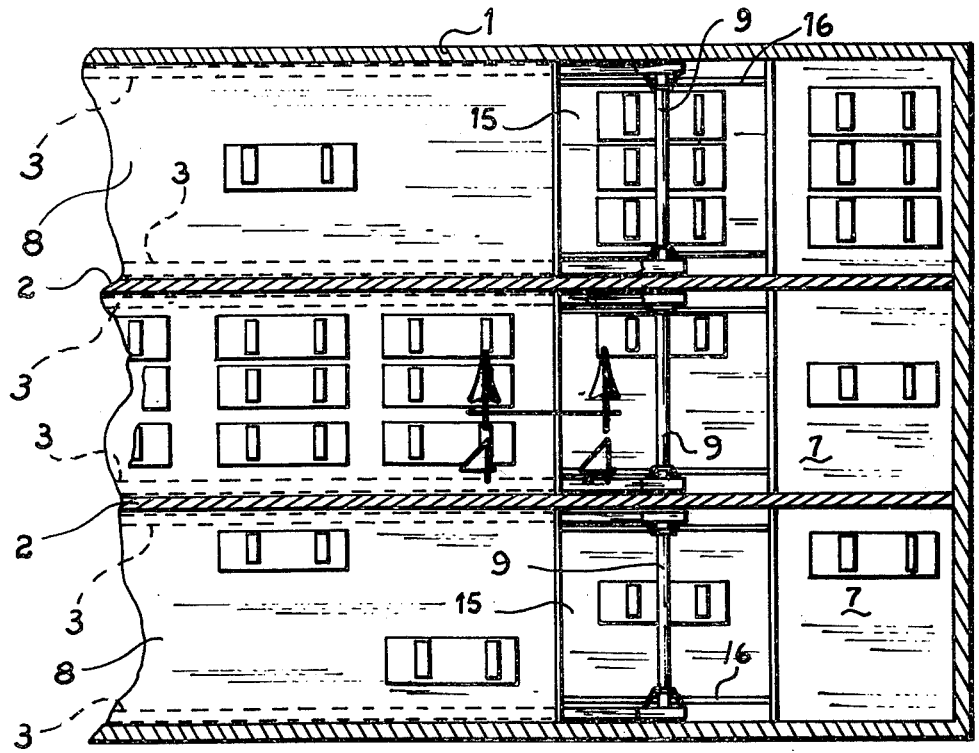
FIG. 2 is a cross-sectional view as seen along line 2—2 in FIG. 1.

The illustrated vehicle parking and rotary elevator assembly includes a building 1 housing three distinct elevator wheels axially aligned and spaced from each other by partitions 2, as shown in FIG. 2.

Figure 3:
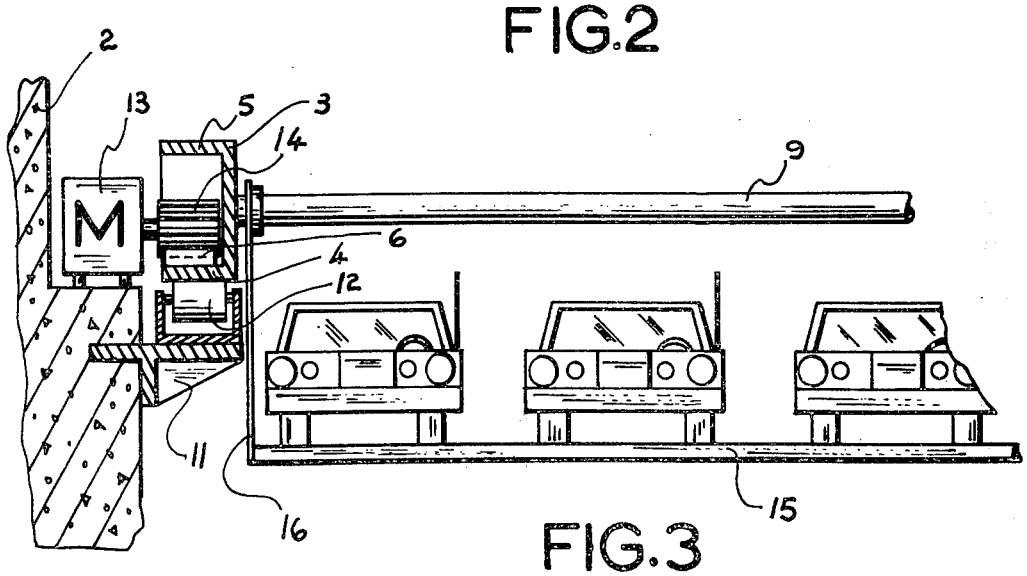
FIG. 3 is a cross-sectional view as seen along line 3—3 in FIG. 1, particularly illustrating a vehicle carrying platform in relationship with one toothed ring and drive therefor.

Each elevator wheel includes a pair of axially spaced-apart rings 3 forming opposite wheel flanges. As best shown in FIG. 3, the ring 3 has a channel shape cross-section defining a pair of coaxial cylindrical flanges 4 and 5. Gear teeth 6 are provided on the outer side of the inner cylindrical flange 4 intermediate the latter and the other cylindrical flange 5. As shown, the annular shape of the ring gears 3 defines a central axial passage through each wheel flange, at the common horizontal axis of the wheel flanges. Thus, axial access to the interior of the wheel is made possible.

The building 1 includes vehicle access and parking floors including stall portions 7 on opposite sides of the wheel and of parking floor portions 8 projecting centrally of the wheel and connected at opposite ends to the associated pair of partitions 2. The parking floors extend into edgewise adjoining relationship relative to the circumferential periphery of the wheel and at different levels relative to the common horizontal axis of the ring gears 3.

Coupling rods 9 are rigidly secured at their opposite ends between the pair of rings 3 forming any elevator wheel and project parallel to each other and to the common horizontal axis. Rigidifying struts 10 may preferably interconnect the corresponding ends of each pair of circumferentially successive rods 9. Other rigidifying struts, or trusses, may be used to more rigidly interconnect each pair of rings 3 in fixed parallel relationship.

Figure 1:
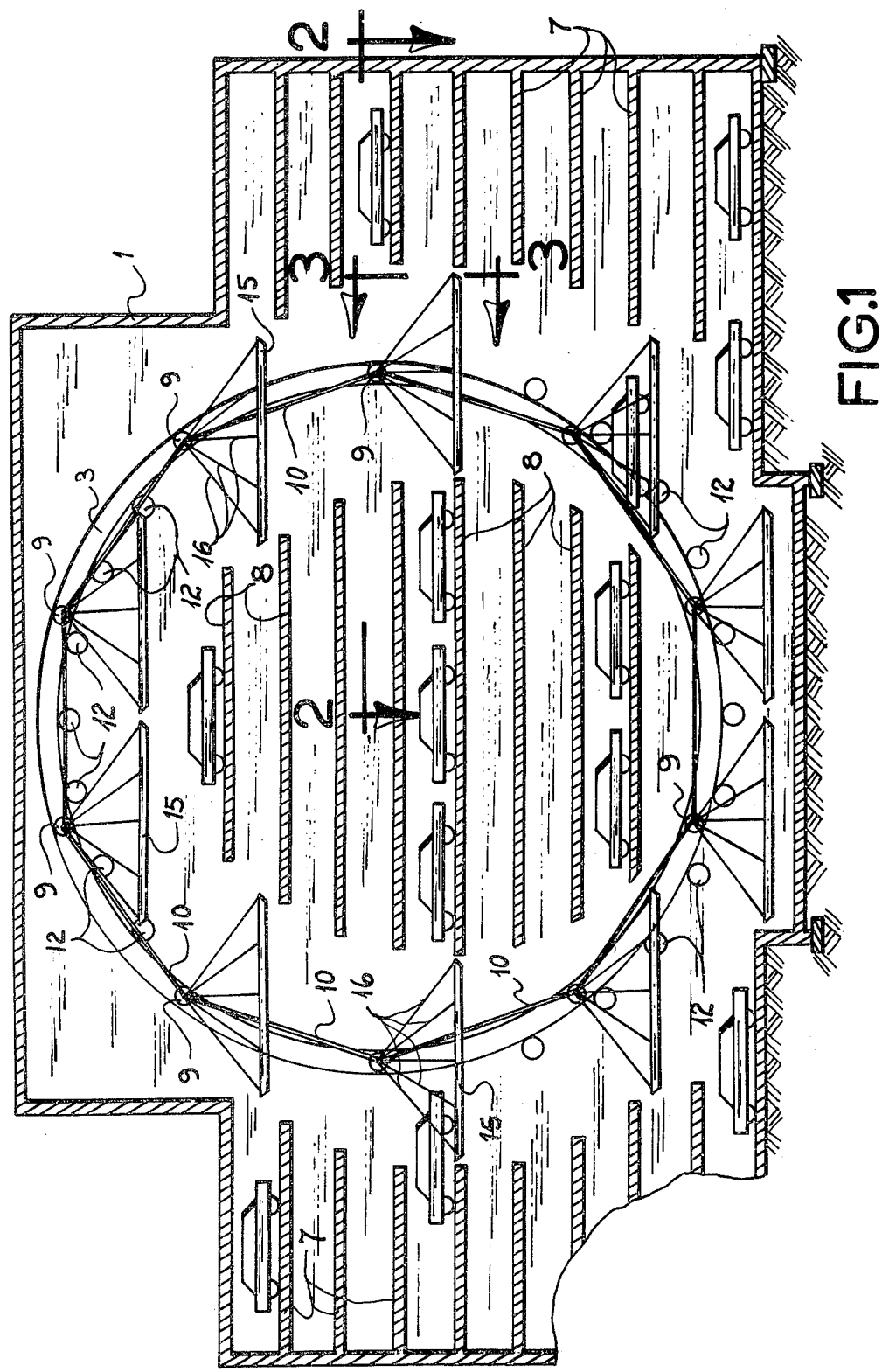
FIG. 1 is a lateral elevation view of a vehicle parking and rotary elevator assembly according to the present invention and showing the parking floor structure in cross-section.

Brackets 11, or any other appropriate expedient, may be used to support idler rollers 12 in supporting engagement with the lower cylindrical face of each cylindrical flange 4 at the top of the wheel and of each cylindrical flange 5 at the bottom of the wheel, as shown in FIGS. 1 and 3. Obviously, the axes of the idler rollers extend parallel to each other and to the common horizontal axis. As shown in FIG. 1, the rollers 12 are laterally spaced apart along substantial portions of the circumference of the wheel, at the top and bottom thereof, and thus positively support the latter in fixed position and minimize the stress concentration by providing multi-point support.

Electric motors 13 are mounted on the partitions 2 on the axially opposite sides of each elevator wheel and drive the latter by pinions 14 meshing with the gear teeth of the ring gears 3.

Vehicle carriers are secured to the elevator wheels and include each a platform 15 and supporting links 16 pivoted at their upper on a corresponding rod 9. Thus, each vehicle carrying platform 15 is pivotally suspended to a transversely coupling rod 9 and extend transversely between the corresponding rings 3.

By rotation of the elevator wheel, any platform may be positioned into edgewise registry with any one of the vehicle parking floors. However, to prevent any platform from bumping the edge of any floor portion, a reasonable gap or clearance is provided between the edge of each floor portion and the normal path of travel of the platforms 15. A junction assembly is provided under each floor portion 7 and 8 and adapted to bridge the associated gap.

As detailed in FIGS. 4, 5, and 6, each junction assembly includes a plate 17 secured by spacers 18 under a corresponding floor portion 7 or 8 and thus forming a shallow compartment under the latter. Similarly, a plate 19 is suspended from each platform 15 by spacers, such as 20. A wide and low carriage 21 is rollably inserted into each of the above-mentioned shallow compartments and includes a top junction panel or plate 22 rollably carried on rollers 23 having their axles supported by brackets 24. A pair of hydraulic cylinders 25 are mounted into each compartment and have their piston 26 connected to a bracket 27 of the corresponding carriage 21. Each carriage 12 may thus be rolled toward and away from a registering platform 15 and engage on the adjoining free edge of the plate 19 thereof. This serves to immobilize the platform against balancing around the supporting rod 9 and to cause a junction plate 22 to bridge the corresponding afore-described gap or clearance.

It should be readily understood that many changes to the afore-described details of construction may be made without departing from the spirit and scope of the invention defined in the appended claims.

For instance, any garage according to the present invention can include merely one or more wheels or can include one or more elevator wheels in combination with one or more levels of parking.

What I claim is:

1. A vehicle parking and rotary elevator assembly comprising a pair of axially spaced-apart annular wheel flanges rotatably and peripherally supported for rotation about a common horizontal axis and defining an axial passage at said common axis, each of the wheel flanges including a ring gear having a channel shape cross-section and forming a pair of coaxial cylindrical flanges and gear teeth secured to one coaxial cylindrical flange of each pair of flanges and extending between the corresponding flanges, a pinion gear for meshing engagement with said gear teeth to rotate said elevator assembly, coupling devices transversely interconnecting the wheel flanges and holding the latter in axially spaced parallel relationship relative to each other, and vehicle carriers pivotally suspended to the axially spaced-apart wheel flanges, transversely extending between the latter and displaceable to edgewise registry with any one of a plurality of vehicle parking floors extending into edgewise adjoining relationship relative to the circumferential periphery of said wheel flanges and at different levels relative to the common horizontal axis.

2. A vehicle parking and rotary elevator assembly as defined in claim 1, further including junction panel assemblies connected to the vehicle parking floors and each including a junction panel extendible toward edgewise engagement with a corresponding one of the vehicle carriers and a carriage rollable toward and away relative to one of the vehicle carriers and having the corresponding junction panel mounted thereon and adapted to substantially bridge the gap between the latter and the corresponding vehicle parking floor.

3. An assembly as defined in claim 1, wherein said coupling devices include rods rigidly secured at opposite ends to said wheel flanges.

4. An assembly as defined in claim 3, wherein said vehicle carriers include each a platform pivotally suspended to one of said rods.

5. A vehicle parking and rotary elevator assembly as defined in claim 4, further including junction panel assemblies supported by said vehicle parking floors respectively and each including a carriage rollable under the corresponding floor toward and away relative to one of said vehicle carriers, each of the latter includes a vehicle carrying platform, a junction panel is secured onto each of said carriages and slidably engageable under the platform of the corresponding vehicle carrier, and a hydraulic cylinder is connected to each of said carriages and adapted to produce said displacements of the corresponding carriage and junction panel.

* * * * *